United States Patent [19]
Ariyoshi et al.

[11] Patent Number: 5,545,986
[45] Date of Patent: Aug. 13, 1996

[54] MAGNETIC SENSOR HAVING A FERROMAGNETIC RESISTIVE ELEMENT, A FRAME AND A BIAS MAGNET INTEGRALLY MOUNTED TO THE FRAME

[75] Inventors: Akihiro Ariyoshi; Masami Matsumura, both of Hyogo, Japan

[73] Assignee: Mitsubishi Denki Kabushiki Kaisha, Tokyo, Japan

[21] Appl. No.: 354,156

[22] Filed: Dec. 6, 1994

Related U.S. Application Data

[63] Continuation of Ser. No. 899,850, Jun. 17, 1992, abandoned.

[30] Foreign Application Priority Data

Jun. 18, 1991 [JP] Japan ..................................... 3-145977

[51] Int. Cl.⁶ .............................. G01B 7/30; G01R 33/06
[52] U.S. Cl. ........................ 324/207.21; 324/252
[58] Field of Search ......................... 324/207.21, 207.22, 324/207.20, 207.25, 207.23, 207.26; 338/32 R; 307/309

[56] References Cited

U.S. PATENT DOCUMENTS

| | | |
|---|---|---|
| 4,053,829 | 10/1977 | Maruo . |
| 4,380,928 | 4/1983 | Iwasaki ........................ 324/207.16 X |
| 4,401,944 | 8/1983 | Narimatsu et al. ................. 324/207.21 |
| 4,490,674 | 12/1984 | Ito ....................................... 324/207.21 |
| 4,492,922 | 1/1985 | Ohkubo ............................. 324/207.21 |
| 4,506,217 | 3/1985 | Rothley et al. ..................... 324/207.21 |
| 4,712,064 | 12/1987 | Eckardt et al. ..................... 324/207.21 |
| 4,754,221 | 6/1988 | Eguchi et al. ..................... 324/207.21 |
| 4,771,240 | 9/1988 | Meyer et al. ................. 324/207.21 X |
| 4,875,008 | 10/1989 | Lorenzen ........................... 324/207.21 |
| 5,055,781 | 10/1991 | Sakakibara et al. ............... 324/207.21 |

FOREIGN PATENT DOCUMENTS

| | | |
|---|---|---|
| 61-120967 | 6/1986 | Japan . |
| 62-148813 | 7/1987 | Japan . |

Primary Examiner—Sandra L. O'Shea
Assistant Examiner—Jay M. Patidar
Attorney, Agent, or Firm—Sughrue, Mion, Zinn, Macpeak & Seas; Richard C. Turner; Peter A. McKenna

[57] ABSTRACT

A magnetic sensor which includes a positioning portion disposed on a bottom surface of a frame at a position opposite a ferromagnetic resistant element through a circuit substrate for positioning and securing a bias magnet.

4 Claims, 2 Drawing Sheets

MAGNETIC SENSOR HAVING A FERROMAGNETIC RESISTIVE ELEMENT, A FRAME AND A BIAS MAGNET INTEGRALLY MOUNTED TO THE FRAME

This is a continuation of application Ser. No. 07/899,850 filed Jun. 17, 1992 now abandoned.

BACKGROUND OF THE INVENTION

1. Field of the Invention

The present invention relates to a magnetic sensor for detecting change in magnetic flux crossing a magnet-sensing plane caused by a rotating magnet, and more particularly to a magnetic sensor detecting a greater rotational angle of the magnet to be and facilitating mass-production.

2. Related Art

The applicant has proposed a magnetic sensor disclosed in the coassigned U.S. patent application filed on Jun. 3, 1992 under Ser. No. 07/893,002 now U.S. Pat. No. 5,278,497 as shown in FIGS. 1 and 2. Specifically, FIG. 1 is a cross-sectional view showing the proposed magnetic sensor and FIG. 2 is a schematic view showing the relationship between a magnet and a ferromagnetic resistive element (hereinafter merely referred as MR element.

The proposed magnetic sensor of Ser. No. 07/893,002 now U.S. Pat. No. 5,278,497 as shown in FIG. 1 is provided with a resin frame 1, a rotating shaft 2 mounted rotatably in the frame 1, an arm 3 fixed to one end of the rotating shaft 2, a cylindrically molded case 4 formed on the other end of the rotating shaft 2, and a magnet 6 accommodated into and secured to the molded case 4 by an adhesion 7.

The magnetic sensor is further provided with a ceramic substrate 8 on which an MR element 9 is mounted. The substrate 8 is a circuit substrate on which a pattern of electric wiring is formed and various kinds of electronic devices are mounted, now shown. The ceramic substrate 8 is mounted on the frame 1 with an outer diameter of the substrate. As shown in FIG. 2, the MR element 9 is provided with a rectangular-shaped magnet-sensitive plane 9a consisting by molding of comb-like patterns 10a, 10b formed of a ferromagnetic resistive material and arranged to cross each other, a ground (GND) terminal 11a, a Vcc terminal 11b and an output terminal 11c, so that the magnet-sensitive plane 9a directs perpendicular to the magnet 6. The magnetic sensor also has an input/output terminal 12.

The operation of the proposed magnetic sensor will now be described hereinbelow.

When the arm 3 rotates in association with the opening/closing condition of a throttle valve (not shown) disposed in an intake conduit performing as an air-flow path of a vehicle, for example, the rotation of the arm 3 is transmitted to the magnet 6 through the rotating shaft 2, that is, the magnet 6 rotates in association with the arm 3.

By the rotation of the magnet 6, the magnetic flux, generated from the magnet 6 and crossing the magnet-sensitive plane 9a, varies and, as a result, the resistance value of the magnetic resistive pattern of the MR element 9 varies in accordance with the variation of the magnetic flux crossing the magnet-sensitive plane 9a. The MR element 9 outputs a voltage corresponding to the rotational angle of the magnet 6.

The output voltage of the MR element 9 is amplified and then output through the input/output terminal 12 to the outside devices (not shown), and the opening/closing condition of the throttle valve is thus detected.

The detection by the MR element 9 will be described in more detail with reference to FIG. 2.

A predetermined voltage is applied between the GND terminal 11a and the Vcc terminal 11b, and the output terminal 11c outputs a voltage obtained by the resistance division of the comb-like patterns 10a and 10b.

When the magnet 6 rotates along an arrow D shown in FIG. 2, the magnetic flux crossing the comb-like patterns 10a and 10b varies accordingly, and the resistance values of the comb-like patterns 10a and 10b also vary and, as a result, the output voltage from the output terminal 11c changes. The output voltage from the output terminal 11c has a sine wave corresponding to the rotation of the magnet 6 as indicated by a line A shown in FIG. 3. As shown in FIG. 3, the output voltage of the output terminal 11c and the rotational angle of the magnet 6 have a linear correlation within a range of angle ±35°. Accordingly, the previously proposed magnetic sensor is capable of detecting the rotational angle of the magnet 6 within the range ±35°.

Since the magnet-sensitive plane 9a of the MR element 9 according to the proposed magnetic sensor is constituted by the comb-like patterns 10a and 10b crossing each other, the rotational angle of the magnet 6 which can be detected is limited to be small.

SUMMARY OF THE INVENTION

The present invention was made to solve the foregoing defect accompanying the proposed (in Ser. No. 07/893,002) magnetic sensor. It is therefore an object of the invention to provide a magnetic sensor capable of detecting the rotational angle of the magnet having a wide range and with high accuracy.

It is another object of the invention to provide a magnetic sensor facilitating mass-production.

The foregoing and other objects of the invention can be achieved by providing a magnetic sensor which, according to the present invention, includes a positioning portion disposed on a bottom surface of a frame at a position opposite a ferromagnetic resistive element through a circuit substrate for positioning and securing a bias magnet.

According to the present invention, during the detection of the rotational angle of the magnet, the direction of the magnetic flux crossing the magnet-sensitive plane coincides with a compound magnetic flux direction of the direction of the magnetic flux of the magnet and that of the bias magnet. The variation of the compound magnetic flux direction is smaller than the variation of the direction of the magnetic flux corresponding to the rotational angle of the magnet. Accordingly, the rotational angle of the magnet which can be detected becomes wide.

Further, since the positioning portion for fixing the bias magnet is disposed on the bottom surface of the frame, the mounting positions of the magnet, circuit substrate and the bias magnet can be controlled easily so that the positional relationship of these components can be determined with high accuracy without influencing the positions of the electronic devices mounted on the circuit substrate.

DESCRIPTION OF THE PREFERRED EMBODIMENTS

The preferred embodiment of the present invention will now described in detail with reference to accompanying drawings.

Figure 1:
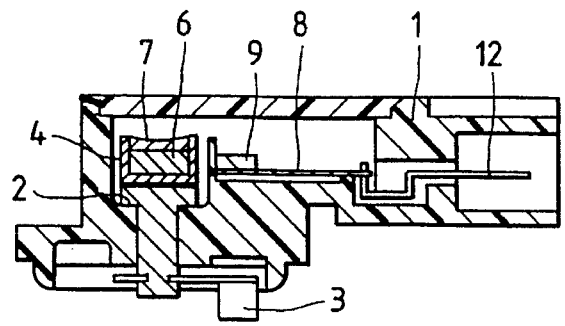
FIG. 1 is a cross-sectional view showing the proposed magnetic sensor.
Figure 2:
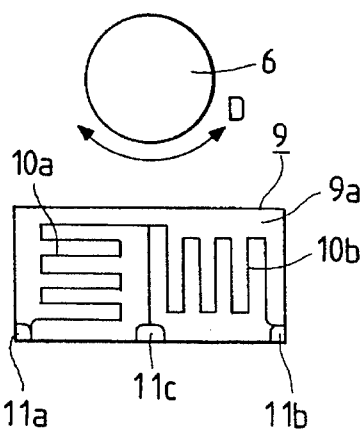
FIG. 2 is a schematic view showing the relationship between a magnet and a ferromagnetic resistant element.
Figure 4:
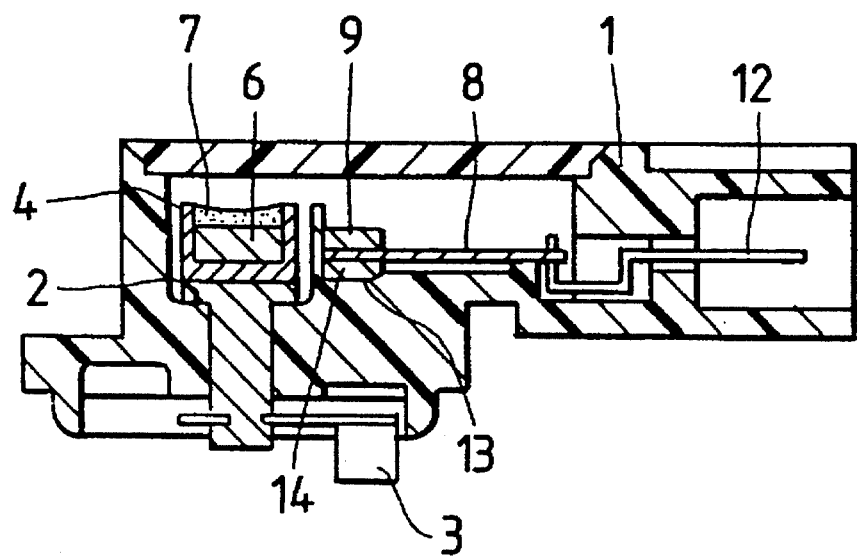
FIG. 4 is a cross-sectional view showing a magnetic sensor embodying the present invention.
Figure 5:
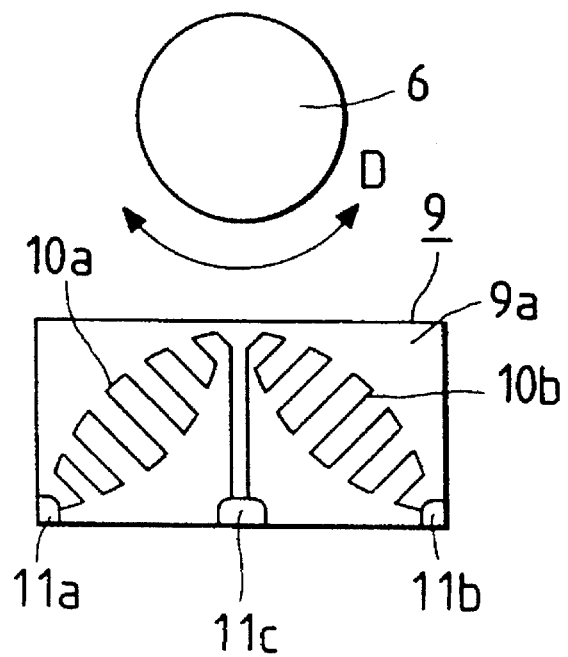
FIG. 5 is a schematic plan view showing the present arrangement of the magnet and the MR element according to the invention.

FIG. 4 is a cross-sectional view showing a magnetic sensor embodying the present invention. FIG. 5 is a schematic plan view showing the arrangement of the magnet and the MR element according to the invention. In the drawings, like parts and components are designated by the same reference numerals as that of FIGS. 1 and 2 showing repetitive proposed magnetic sensor and, accordingly, the explanation will be omitted.

The magnetic sensor of the present invention is provided with a positioning portion 13 for positioning and securing a bias magnet 14. The positioning portion 13 is disposed on a bottom surface of the resin frame 1 at a position opposite the MR element through the ceramic substrate 8. The positioning portion 13 is formed at the same time as the molding of the resin frame 1. The magnet-sensitive plane 9a of the MR element 9 has comb-like patterns 10a and 10b which are laterally symmetrical and cross perpendicularly to each other.

According to the present invention, as described above, the positioning portion 13 is formed on the bottom surface of the resin frame 1 at the same time as the molding of the frame 1, and the rotational shaft 2, ceramic substrate 8 and bias magnet 14 are mounted at predetermined positions on the resin frame 1. Therefore, the positional relationship of the magnet 6, MR element 9 and the bias magnet 14 are determined with high accuracy, so that variation in the positional relationship between the magnet 6, MR element 9 and the bias magnet 14 which influences the detection of the rotational angle of the magnet is effectively eliminated. Therefore, according to the invention, accordingly, a magnetic sensor having a highly accurate sensitivity can stably be manufactured. Further, since the bias magnet 14 is positioned and secured on the bottom surface of the resin frame 1, the existence of the bias magnet 14 does not obstruct the positional arrangement of the electronic devices mounted on the ceramic substrate 8.

The operation of the magnetic sensor according to the present invention will now be described below.

Figure 3:
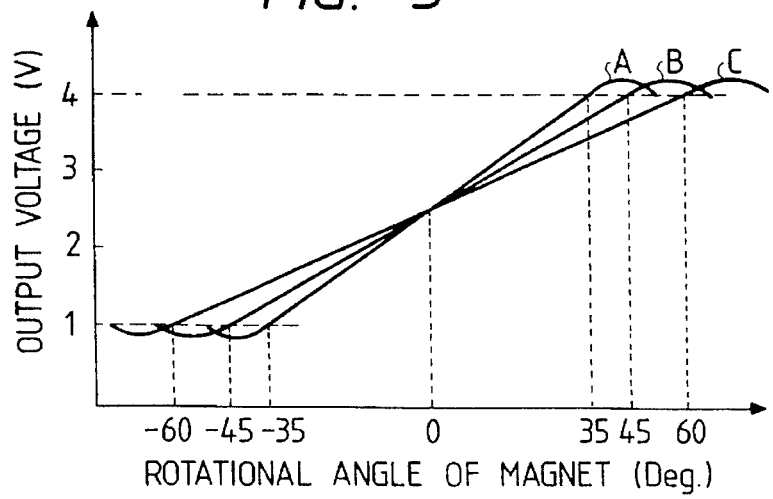
FIG. 3 is a graph showing a relationship between a rotational angle of the magnet and an output voltage.

In the first step, before mounting the bias magnet 14, the magnetic flux crossing the magnet-sensitive plane 9a varies in accordance with the rotation of the magnet 6 and accordingly the resistant values of the comb-like patterns 10a and 10b vary, and then the terminal 12 outputs an output voltage which is resistance-divided by the comb-like patterns 10a and 10b. The output voltage of the terminal 12 has a sine wave as indicated by a line B shown in FIG. 3. As is apparent from FIG. 3, the rotational angle of the magnet 6 which can be detected is widened to within the range of ±45°.

In the next step, the bias magnet 14 is mounted in and secured into the positioning portion 13, the direction of the magnetic flux crossing the magnet-sensitive plane 9a coincides with a compound magnetic flux direction of the direction of the magnetic flux of the magnet 6 and that of the bias magnet 14. The variation of the rotational angle of the compound magnetic flux direction corresponding to the rotation of the magnet 6 becomes smaller than the variation of the rotational angle of the direction of the magnetic flux from the magnet 6 corresponding to the rotation of the magnet 6. Accordingly, the rotational angle of the magnet 6 to be detected becomes more wide to be within a range of ±60° as indicated by $\underline{C}$ shown in FIG. 3 because the MR element 9 actually detects the variation of the magnetic flux crossing the magnet-sensitive plane 9a thereof.

The operation of the magnetic sensor of the invention other than described above is the same as that of the previously proposed magnetic sensor shown in FIG. 1.

Although the embodiment above employs the comb-like patterns 10a and 10b which are laterally symmetrical and cross perpendicular as shown in FIG. 5, the comb-like patterns may be arranged as shown in FIG. 2 to obtain the same effects.

As described above, according to the present invention, since a positioning portion is disposed on a bottom surface of a frame at a position opposite a ferromagnetic resistant element through a circuit substrate for positioning and securing a bias magnet, the detectable range of the rotational angle of the magnet becomes wide and, further, the magnetic sensor of the invention facilitates a mass-production.

What is claimed is:

1. A magnetic sensor comprising:
    a frame formed of resin, said frame having an internal cavity formed therein;
    a rotating shaft rotatably disposed in a bottom part of said frame;
    a magnet accommodated in said frame, said magnet being mounted on one end of said rotating shaft;
    a ceramic substrate accommodated in the bottom part of said frame;
    a ferromagnetic resistive (MR) element mounted on the ceramic substrate facing a top portion of the internal cavity, said ferromagnetic resistive element having a magnet-sensitive plane for detecting variation of the magnetic flux crossing said magnet-sensitive plane;
    a bias magnet mounted opposite to the ferromagnetic resistive element and below the ceramic substrate as an integral part of the frame to bias said ferromagnetic resistive element; and
    an output element connected to said ferromagnetic resistive element for outputting an output signal.

2. The magnetic sensor of claim 1, wherein said magnet-sensitive plane of said MR element comprises comb-like patterns which are laterally symmetrical and cross perpendicularly to each other.

3. The magnetic sensor of claim 1, wherein said magnet-sensitive plane of said MR element comprises comb-like patterns arranged to cross each other.

4. The magnetic sensor of claim 1, wherein mounting of said bias magnet and molding of said frame are performed simultaneously.

* * * * *